US010417060B2

(12) United States Patent
Shah et al.

(10) Patent No.: US 10,417,060 B2
(45) Date of Patent: Sep. 17, 2019

(54) AUTOMATED API PUBLICATION FOR INTERNET OF THINGS PLATFORM

(71) Applicant: Verizon Patent and Licensing Inc., Arlington, VA (US)

(72) Inventors: Tirth Nikhil Mona Shah, Waltham, MA (US); Lin Zhu, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 330 days.

(21) Appl. No.: 15/193,691

(22) Filed: Jun. 27, 2016

(65) Prior Publication Data

US 2017/0371937 A1    Dec. 28, 2017

(51) Int. Cl.
*G06F 8/71*  (2018.01)
*G06F 9/54*  (2006.01)
*G06F 11/36*  (2006.01)

(52) U.S. Cl.
CPC .............. *G06F 9/541* (2013.01); *G06F 8/71* (2013.01); *G06F 11/3672* (2013.01); *G06F 11/3696* (2013.01)

(58) Field of Classification Search
CPC ....................................................... G06F 9/541

USPC ........................................................ 707/722
See application file for complete search history.

(56) References Cited

U.S. PATENT DOCUMENTS

| 7,676,794 | B2 * | 3/2010 | Akiyama | G06F 8/30 |
| | | | | 714/38.14 |
| 8,201,191 | B2 * | 6/2012 | Ladd | H04L 63/10 |
| | | | | 709/229 |
| 2016/0171589 | A1 * | 6/2016 | Glover | G06Q 30/0631 |
| | | | | 705/26.7 |
| 2016/0247238 | A1 * | 8/2016 | Kunapuli | G06Q 40/12 |

* cited by examiner

*Primary Examiner* — Alford W Kindred
*Assistant Examiner* — Allen S Lin

(57) ABSTRACT

A computer system may include a processor configured to search storage locations for candidate Application Programming Interface (API) files that are to be published on an Internet of Things (IoT) platform configured to interact with IoT devices for different device manufacturers. The processor may generate a list of candidate APIs based on searching the storage locations; generate a list of published platform APIs published on the IoT platform; compare the list of candidate APIs with the list of published platform APIs; generate an API create list based on the comparing; generate an API update list based on the comparing; create one or more candidate APIs from the generated API create list on a testing system; and update one or more candidate APIs from the generated API update list on the testing system.

20 Claims, 13 Drawing Sheets

AUTOMATED API PUBLICATION FOR INTERNET OF THINGS PLATFORM

BACKGROUND INFORMATION

In order to satisfy the needs and demands of users of mobile communication devices, providers of wireless communication services continue to improve and expand available services and networks. One aspect of such improvements includes the development of wireless access networks for Internet of Things (IoT) applications. A provider's wireless access networks may communicate with a large number of IoT devices of various types from different manufacturers. The provider may make available to customers various functionalities to manage and communicate with the IoT devices connected to the provider's wireless access network.

DETAILED DESCRIPTION OF PREFERRED EMBODIMENTS

Figure 1:
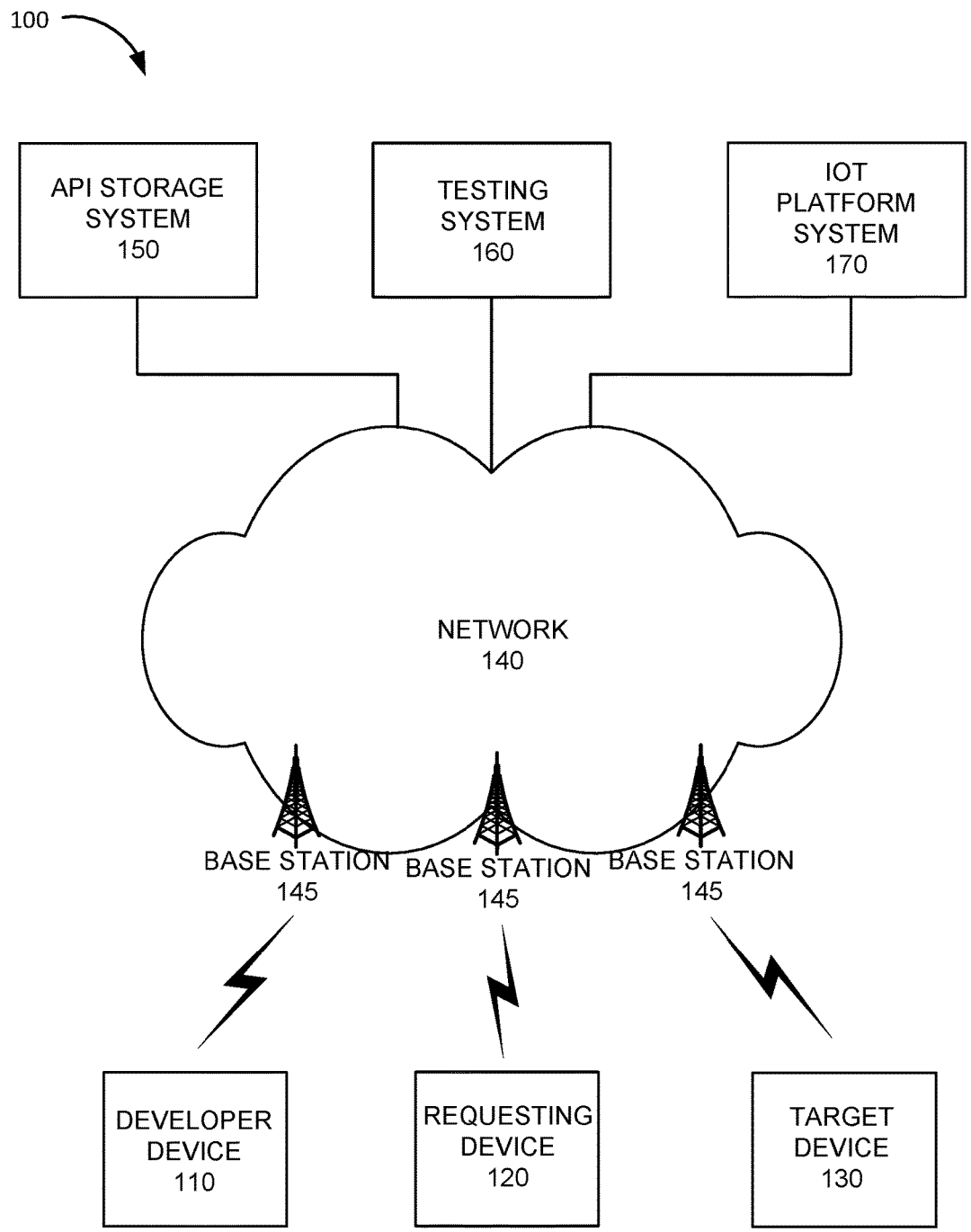
FIG. 1 is a diagram illustrating an environment according to an implementation described herein.

The following detailed description refers to the accompanying drawings. The same reference numbers in different drawings identify the same or similar elements.

A wireless communication device, also referred to herein as a user equipment (UE), may be configured to participate in machine-to-machine (M2M) communication for Internet of Things (IoT) applications. For example, the wireless communication device may be configured to communicate using machine-type communication (MTC), a type of M2M communication standardized by the $3^{rd}$ Generation Partnership Project (3GPP) for Long Term Evolution (LTE) wireless access networks. Two devices may communicate via MTC using wireless signals without requiring user participation. A provider of wireless communication services may manage wireless access networks that include a large number of M2M devices. The M2M devices may be configured to communicate with other M2M devices or with UE devices operated by users. The provider may further manage a system that includes an IoT platform that enables manufacturers, developers, and users to create, update, manage, and/or use technologies and functionalities for communicating, accessing, managing, controlling, and/or otherwise using M2M devices.

A device may interact with an M2M device using one or more Application Programming Interfaces (APIs). An API may include a set of definitions for a structured format for interacting with an M2M device to perform a particular function. For example, an API may specify a particular format for a particular command or request for an M2M device, for a group of M2M devices, and/or for an account associated with an M2M device or a group of M2M devices. The particular format may specify one or more required parameters and/or provide for one or more optional parameters, and may include a format for each parameter. An application running on a user device or another M2M device may use the API to execute the particular command or request with respect to the M2M device, group of M2M devices, and/or the account associated with an M2M device or group of M2M devices.

The IoT platform system may publish available APIs for M2M devices and may enable manufacturers of M2M devices and/or third-party developers to publish APIs on the platform system. As the number of M2M devices grows, the number of published APIs and the number of APIs waiting to be published will continue to increase. Moreover, the published APIs will continue to be updated and/or deleted by manufacturers of M2M devices and/or third party developers. Manual analysis to determine whether an API needs to be created, updates, or deleted may be time consuming and labor intensive.

Implementations described herein relate to automated API publication for an IoT platform system. The IoT platform system may be configured to interact with IoT devices associated with many different device manufacturers and may store published platform APIs associated with the IoT devices. A published platform API may be publicly accessible and may include information related to the API and how to access, call, execute, and/or otherwise use the API. For example, the published platform API may include information identifying the name and version of the API, as well as one or more contexts of the API, one or more tags associated with the API, a description of the API, visibility information identifying whether the API is public or private, information identifying a Uniform Resource Locator (URL) associated with the API, information identifying a URL endpoint used to access the API, supported transport types for the API, available throttling tiers for the API, information identifying a default version of the API, and/or other types of information associated with the API.

The IoT platform system may map published APIs to device model APIs for particular device types that are independent of particular manufacturer implementations. When an M2M device sends requests using an API to another M2M device, or when a user sends a request to an M2M device via an application, the request may be generated as a manufacturer-independent request using a device model API. Alternatively, a manufacturer-specific request may be converted to a manufacturer-independent device model API request. Thus, the device model APIs may function as a universal language between different device implementations and may be independent of a manufacturer implementation of a target device associated with the device model API. When an API is published on the IoT platform system, the API may be mapped by the IoT platform system to a device model API for a device type associated with the API.

Before a candidate API is published on the IoT platform system, the candidate API may need to be published on a testing system that includes a virtual model of the IoT platform system and tested to ensure that the API functions correctly and/or that mapping from the API to a device model API functions correctly. A testing system may automatically search multiple storage locations for candidate API files that are to be published on the IoT platform system. A candidate API may include information that is to be included in a published API and may be stored in one of the multiple storage locations. The candidate API may be identified based on one or more mandatory fields, associated with published platform APIs, in a specified format. The storage locations may include, for example, a developer system used to develop APIs. Additionally or alternatively, the storage locations may include cloud storage locations in a cloud center associated with the provider and/or other storage locations designated for storing candidate APIs. The testing system may generate a list of candidate APIs based on searching the storage locations and may parse the identified candidate APIs into a format that includes one or more mandatory fields and/or one or more optional attribute fields.

The testing system may further generate a list of published platform APIs published on the IoT platform system, may compare the generated list of candidate APIs with the generated list of published platform APIs. Based on the comparison, the testing system may generate: an API create list that includes APIs that are to be created; an API update list that includes APIs that correspond to APIs to be updated, and a remove API list of APIs that are to be removed from the list of published platform APIs.

The API create list may be generated by selecting a candidate API from the generated list of candidate APIs, determining whether the selected candidate API has no matching name and version in the list of published platform APIs, and, if so, adding the selected candidate API to the API create list.

The API update list may be generated by determining whether the selected candidate API has a matching name and version in the list of published platform APIs (for a particular published platform API in the list of platform APIs); and if so, determining whether the selected candidate API and the particular published platform API have a mismatch in one or more detailed information fields. If there is a mismatch, the candidate API is added to the API update list. If there is no mismatch in any of the detailed information fields between the selected candidate API and the particular published platform API, then the particular published platform API is removed from the list of published platform APIs.

After each candidate API from the list of candidate APIs is selected and compared to the list of published platform APIs, any remaining APIs in the list of published platform APIs are added to the API remove list because the remaining published platform APIs do not differ from a version that is already published and therefore no updating or testing needs to be performed with respect to the remaining published platform APIs.

The testing system may then publish the APIs from the three lists on the testing system and, as part of the publication, may perform a corresponding action on the APIs based on which list each APIs has been placed. The APIs from the remove API list may be removed from the testing system, since no action needs to be performed on the APIs included in the remove API list.

The APIs from the create API list may be created on the testing system. The testing system may select an API from the create API list, may publish the selected API to the testing system, and may perform a mapping from the selected API to a device model API. The mapping may include, for example, mapping parameters of the selected API to corresponding parameters of a device model API. Furthermore, the testing system may test the created API using one or more automated testing scripts. If the testing system determines that the testing of the created API is successful, the created API may be published to the IoT platform system.

The APIs from the update API list may be updated on the testing system. For example, the testing system may select an API from the update API list, may publish the selected API to the testing system and may compare each field of the selected API with a corresponding field in the matching published platform API to identify fields that differ. Each identified differing field may be updated based on the information in the selected API and testing of the updated fields may be performed using one or more automated testing scripts. If the testing system determines that the testing of the updated API is successful, the updated API may be published to the IoT platform system.

FIG. 1 is a diagram of an exemplary environment 100 in which the systems and/or methods, described herein, may be implemented. As shown in FIG. 1, environment 100 may include a developer device 110, a requesting device 120, a target device 130, a network 140, a API storage system 150, a testing system 160, and an IoT platform system 170.

While FIG. 1 shows a single developer device 110, a single requesting device 120, a single target device 130, a single network 140, a single API storage system 150, a single testing system 160, and a single IoT platform system 170 for illustrative purposes, in practice, environment 100 may include multiple developer devices 110, multiple requesting devices 120, multiple target devices 130, multiple networks 140, multiple API storage systems 150, multiple testing systems 160, and/or multiple IoT platform systems 170.

Developer device 110 may be used by a developer to access API storage system 150 and generate one or more candidate APIs that are to be published on IoT platform system 170. Developer device 110, and/or requesting device 120, may each include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; a home appliance device; a home monitoring device; and/or any other type of computer device with wireless communication capabilities.

Requesting device 120 may use an API published on IoT platform system 170 to execute a request or command associated with target device 130. Target device 130, and requesting device 120 may each include a wireless device configured to communicate with other devices over an M2M interface. For example, target device 130 and/or requesting device 120 may each include a sensor device, such as an environment monitoring sensor (e.g., a temperature sensor, a humidity sensor, a pressure sensor, a wind speed sensor, a motion detector, a light detector, a camera, a microphone, etc.); a health monitoring sensor (e.g., a blood pressure monitoring device, a blood glucose monitoring device, etc.); a location sensor (e.g., a Global Positioning System receiver, etc.); a position or tilt sensor (e.g., an accelerometer, a gyroscope, etc.); a sensor monitoring one or more functions of a vehicle (e.g., a climate sensor, an engine sensor, etc.), a sensor monitoring an electronic sign (e.g., an electronic billboard, etc.), a sensor monitoring a manufacturing system (e.g., a robot arm sensor, an assembly line sensor, etc.), a security system sensor (e.g., a camera, a motion sensor, a window sensor, a lock sensor, a proximity sensor, etc.), a power system sensor (e.g., a smart grid monitoring device, etc.), a sensor monitoring a financial transaction system (e.g., a point-of-sale terminal, a vending machine, etc.), and/or another type of electronic sensor device.

Additionally or alternatively, target device 130 and/or requesting device 120 may each include an actuator device. The actuator device may include an electrical and/or mechanical mechanism to convert electrical and/or magnetic energy into motion. For example, the actuator device may include a microelectromechanical (MEMS) actuator, an electric motor, a piezoelectric actuator, a pneumatic actuator, an electroactive polymer device, a thermal bimorph device, and/or another type of actuator device.

Additionally or alternatively, target device 130 and/or requesting device 120 may each include a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, a parking meter, etc.), and/or another type of electronic device.

Network 140 may include a local area network (LAN), a wide area network (WAN), a metropolitan area network (MAN), an optical network, a cable television network, a satellite network, one or more wireless networks (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. The one or more access networks may include base stations 145. Each base station 145 may enable devices to communicate with network 140 using wireless signals. For example, base station 145 may include an eNodeB that enables a device, such as developer device 110, requesting device 120, and/or target device 130 to communicate, via wireless signals and an LTE wireless access network, with network 140.

API storage system 150 may include one or more computer devices, such as server devices, which store candidate APIs that are to be published on IoT platform system 170. As an example, API storage system 150 may include a storage location designated by IoT platform system 170 as a location for storing candidate APIs. For example, API storage system 150 may include one or more devices in a cloud center that provide cloud storage for customers associated with the provider of communication services that manages IoT platform system 170. As another example, API storage system 150 may include a developer system accessed by developer device 110 and used to develop candidate APIs by a particular developer. As yet another example, API storage system 150 may include an API development platform managed by the provider associated with IoT platform system 170.

Testing system 160 may include one or more computer devices, such as server devices, which perform automatic publishing and testing of candidate APIs. For example, testing system 160 may access, at particular intervals or in response to a command or request, multiple API storage systems 150 to identify candidate APIs. Testing system 160 may further access IoT platform system 170 to identify published APIs. Testing system 160 may compare the candidate APIs to the published APIs to identify APIs that need to be created and APIs that need to be updated. Testing system 160 may generate a virtual model of IoT platform system 170, may publish the candidate APIs to the virtual model, and may test the candidate APIs. If the tests of the candidate APIs are successful, testing system 160 may publish the candidate APIs to IoT platform system 170.

IoT platform system 170 may include one or more computer devices, such as server devices, which store and maintain published APIs for M2M devices. For example, IoT platform system 170 may include documentation that explains how to use a particular API and may store code, and/or may point to code, which processes API requests for published APIs. Furthermore, IoT platform system 170 may maintain device model APIs that provide standardized APIs for particular device types. M2M devices or applications on user devices may use the device model APIs to make requests to other M2M devices. IoT platform system 170 may translate the device model APIs to published APIs associated with particular M2M devices. Moreover, IoT platform system 170 may be configured to interact with user devices, such as mobile wireless devices, to develop applications that interact with IoT platform system 170 and use APIs published on IoT platform system 170.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
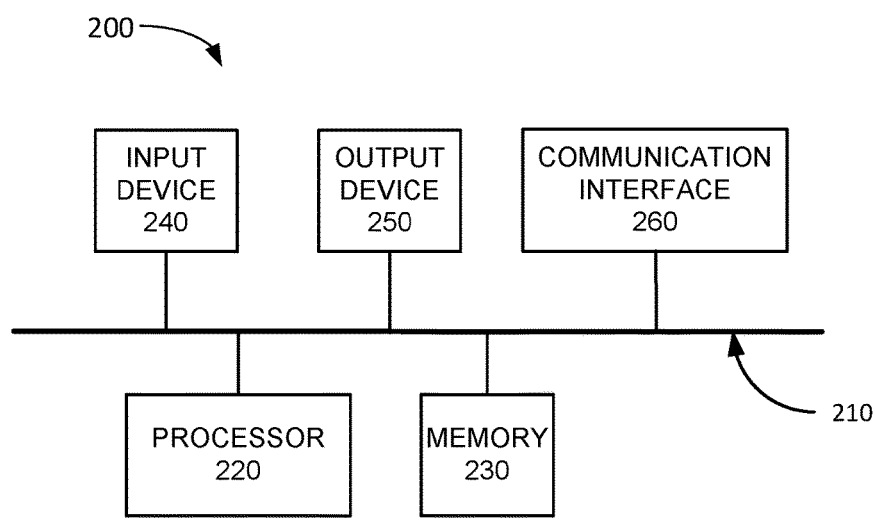
FIG. 2 is a diagram illustrating an exemplary implementation of a device that may be included in the API storage system, testing system and/or IoT platform system of FIG. 1.

FIG. 2 is a diagram illustrating exemplary components of a device 200 according to an implementation described herein. API storage system 150, testing system 160, and/or IoT platform system 170 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include an LCD for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to automated publishing of APIs for an IoT platform system. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3:
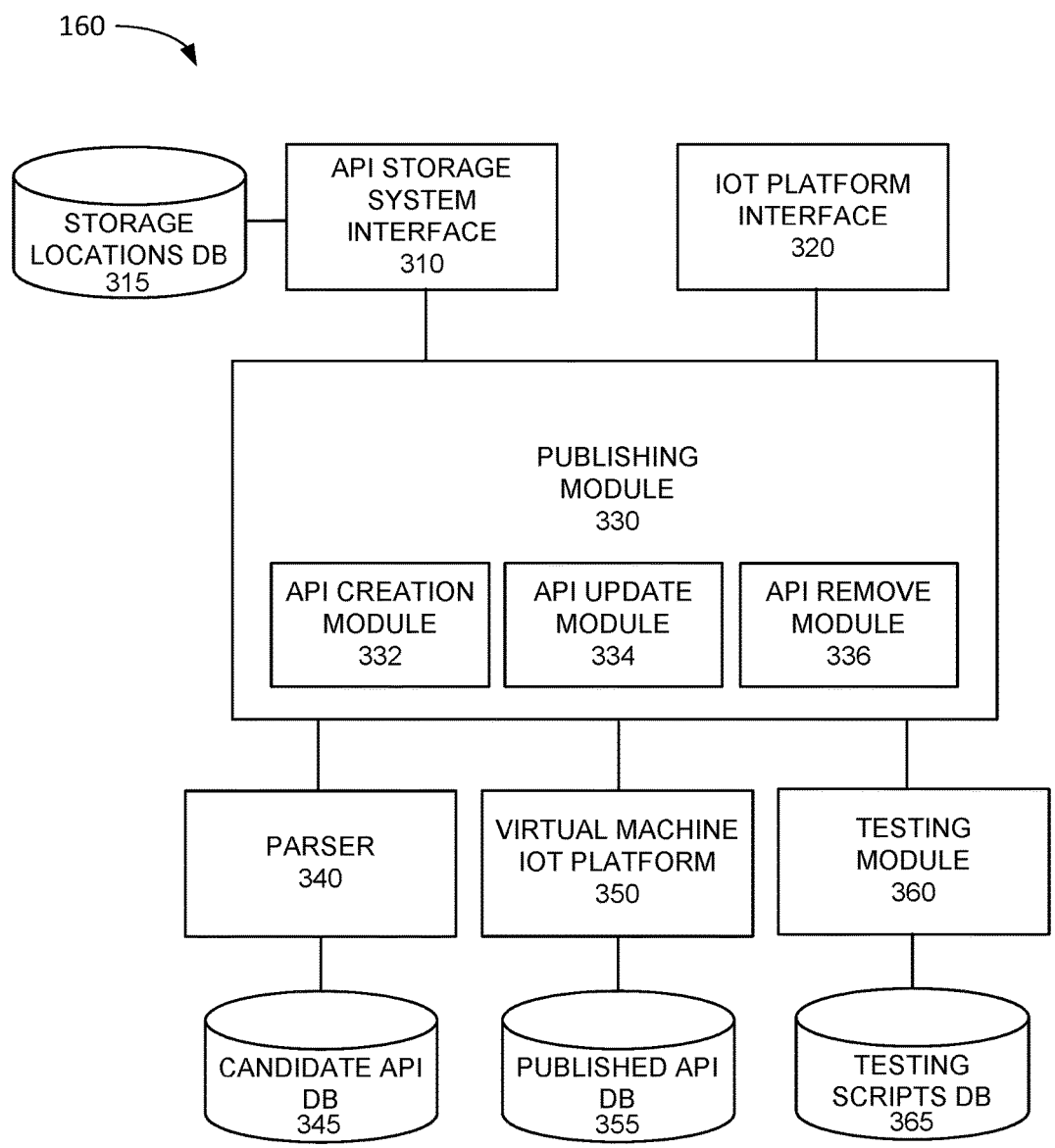
FIG. 3 is a diagram illustrating exemplary functional components of the testing system of FIG. 1.

FIG. 3 is a diagram illustrating exemplary functional components of testing system 160 according to an implementation described herein. The functional components of testing system 160 may be implemented, for example, via processor 220 executing instructions from memory 230. Alternatively, some or all of the functional components of testing system 160 may be implemented via hard-wired circuitry. As shown in FIG. 3, testing system 160 may include a API storage system interface 310, a storage locations database (DB) 315, an IoT platform interface 320, a publishing module 330, a parser 340, a candidate API DB 345, a virtual machine IoT platform 350, a published API DB 355, a testing module 360, and a testing scripts DB 365.

API storage system interface 310 may be configured to communicate with API storage systems 150 to obtain candidate APIs. Storage locations DB 315 may include information identifying storage locations that are to be searched for candidate APIs, such as storage locations associated with API storage systems 150. API storage system interface 310 may access the identified storage locations at particular intervals to identify and retrieve candidate APIs. Additionally or alternatively, API storage system interface 310 may receive a request from developer device 110 and/or API storage system 150 to publish candidate APIs stored on API storage system 150.

IoT platform interface 320 may communicate with IoT platform system 170. IoT platform interface 320 may access IoT platform system 170 to identify and obtain a list of published platform APIs. Furthermore, IoT platform interface 320 may provide tested candidate APIs to IoT platform system 170 for publishing. IoT platform interface 320 may sync with IoT system 170 at particular intervals to ensure that the list of published APIs in published API DB 355 associated with virtual machine IoT platform 350 is up to date with respect to the APIs published on IoT platform system 170.

Publishing module 330 may publish candidate APIs to virtual machine IoT platform 350 to create and/or update APIs and to test the created or updated APIs. Publishing module 330 may obtain a list of candidate APIs from API storage system interface 310 and provide the candidate APIs to parser 340. Parser 340 may parse the candidate APIs into a particular format corresponding to the format used by IoT platform system 170 for published API and store the candidate APIs in candidate API DB 345. Publishing module 330 may obtain a list of published platform APIs from IoT platform interface 320 and may store the list of published platform APIs in published API DB 355. Exemplary information that may be stored in candidate API DB 345 and/or published API DB 355 is described below with reference to FIG. 4.

Publishing module 330 may include an API creation module 322, an API update module 334, and an API remove module 336. Publishing module 330 may compare candidate APIs stored in candidate API DB 345 with published APIs stored in published API DB 355 to generate a create API list, an update API list, and a remove API list. API creation module 332 may create APIs included in create API list by publishing them to published API DB 355. API update module 334 may update published APIs in published API DB 355 based on information included in matching identified candidate APIs. API remove module 336 may remove APIs from published API DB 355 that do not need to be updated and/or tested because there are no matching candidate APIs in candidate API DB 345.

Virtual machine IoT platform 350 may correspond to a virtual machine version of IoT platform system 150 and may thus simulate IoT platform system 150. Testing module 360 may test candidate APIs published to virtual machine IoT platform 350 using testing scripts stored in testing scripts DB 365. For example, testing module 360 may simulate a particular device, operating system, and/or communication method to send a request to an API in published API DB 355 and may obtain and analyze a response received from virtual machine IoT platform 350. For example, a testing script may make a first request to a published API using all required parameters, may make a second request with an invalid parameter value, may make a third request with a missing parameter value, etc. Furthermore, testing module 360 may test the API by simulating different types of devices, different operating systems, different applications, and/or different communication methods.

Although FIG. 3 shows exemplary functional components of testing system 160, in other implementations, testing system 160 may include fewer functional components, different functional components, differently arranged functional components, or additional functional components than depicted in FIG. 3. Additionally, or alternatively, one or more functional components of testing system 160 may perform functions described as being performed by one or more other functional components of testing system 160.

Figure 4:
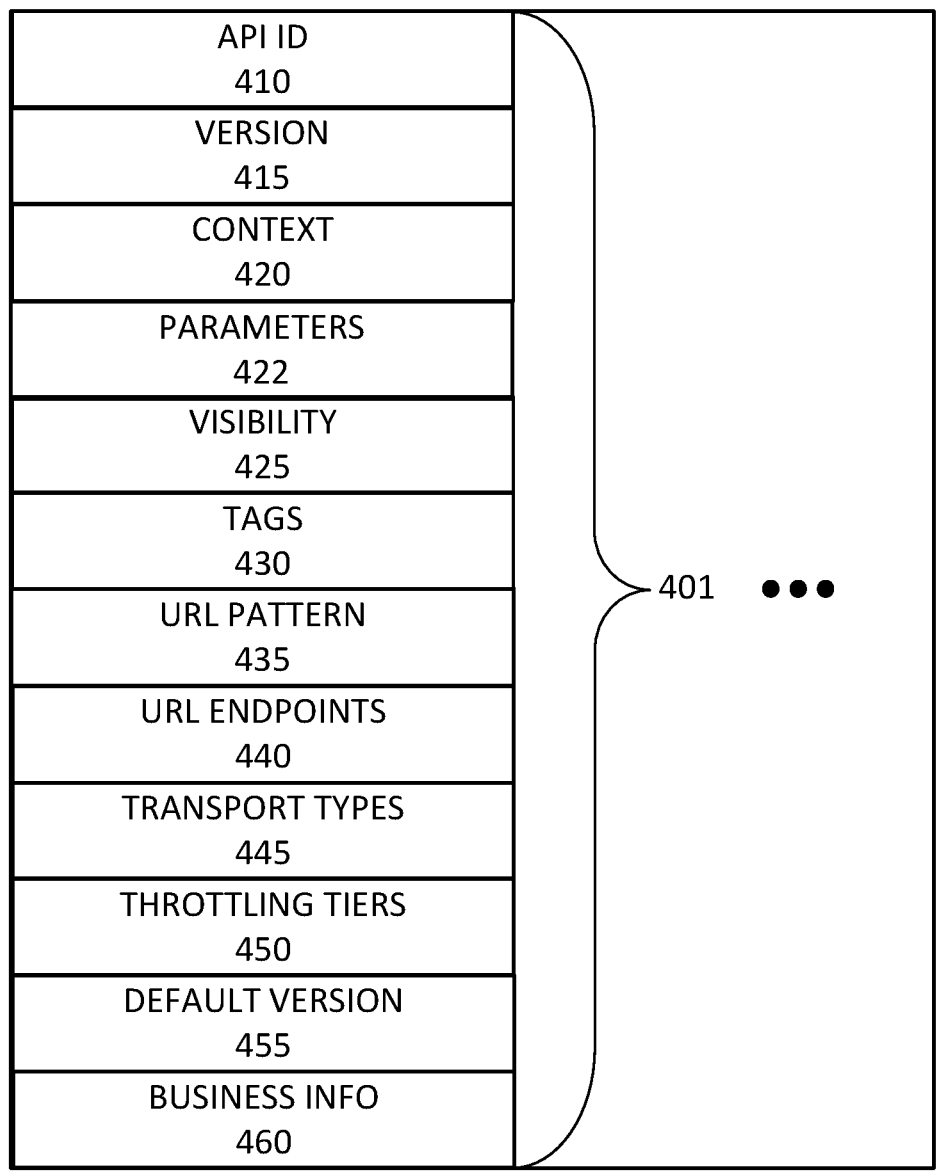
FIG. 4 is a diagram illustrating exemplary components of the candidate Application Programming Interface (API) database (DB) or the published API DB of FIG. 3.

FIG. 4 is a diagram illustrating exemplary components of candidate API DB 345 or published API DB 355. As shown in FIG. 4, candidate API DB 345 or published API DB 355 may include one or more API records 401. Each API record 401 may store information relating a particular API. API record 401 may include an API identifier (ID) field 410, a version field 415, a context field 420, a parameters field 422, a visibility field 425, a tags field 430, a URL pattern field 435, a URL endpoints field 440, a transport types field 445, a throttling tiers field 450, a default version field 455, and a business information field 460.

API ID field 410 may include a name and/or an ID that uniquely identifies a particular API. The name and/or ID may be in a specified format associated with IoT platform system 170. Version field 415 may specify a version for the particular API. Thus, different versions of the same API may be stored in different API records 401. Context field 420 may specify one or more contexts for the particular API. A context may specify a field of use for the particular API and/or may classify the API in a hierarchical classification scheme (e.g., sensor category, temperature sensor subcategory, data retrieval subcategory, etc.). Furthermore, context may also identify a third party vendor entity and/or a particular product and/or service line. For example, if three vendors A, B, and C each provide two different API solutions 1 and 2 for a particular device type or for a particular type of request, the context may be identified based on the vendor and the API solutions: A1, A2, B1, B2, C1, and C2. In some implementations, API ID field 410, version field 415, and context field 420 may be designated as mandatory fields and other fields may be designated as optional fields. In other implementations, fewer or additional fields may be designated as mandatory fields.

Parameters field 422 may store information identifying one or more mandatory parameters and one or more optional parameters associated with the particular API. Visibility field 425 may identify whether the particular API is public or private and/or may identify a class of users that may access the API. For example, a first version of an API may be a public version of the API and a second version of the API may be a private version that includes additional parameters. Tags field 430 may include information identifying one or more tags associated with the particular API. The tags may be further used to classify the particular API and/or associate the particular API with applications and/or devices types.

URL pattern field 435 may identify a URL pattern associated with the API. Furthermore, URL pattern field 435 may identify one or more Hypertext Transfer Protocol (HTTP) verbs (e.g., GET, PUT, POST, DELETE, etc.) associated with the particular API. URL endpoints field 440 may identify one or more endpoints associated with the API. A URL endpoint may store code that processes requests for the particular API. Transport types field 445 may store information identifying one or more transport types supported by the particular API (e.g., HTTP, HTTP Secure (HTTPS), etc.).

Throttling tiers field 450 may store information identifying one or more data throttling tiers associated with the particular API. For example, a first throttling tier may limit requests to the particular API a first number of times in a time period (e.g., 10 requests per second), a second throttling tier may limit requests to the particular API a second number of times in the time period (e.g., 5 requests per second), etc. Default version field 455 may identify a default version of the particular API. The default version may be invoked by another M2M device or an application on a user device if another version does not function correctly. Business info field 460 may include business information associated with the particular API, such as, for example, one or more rates for using the API.

Although FIG. 4 shows exemplary fields stored in candidate API DB 345 or published API DB 355, in other implementations, candidate API DB 345 or published API DB 355 may include fewer fields, different fields, differently arranged fields, or additional fields than depicted in FIG. 4.

Figure 5:
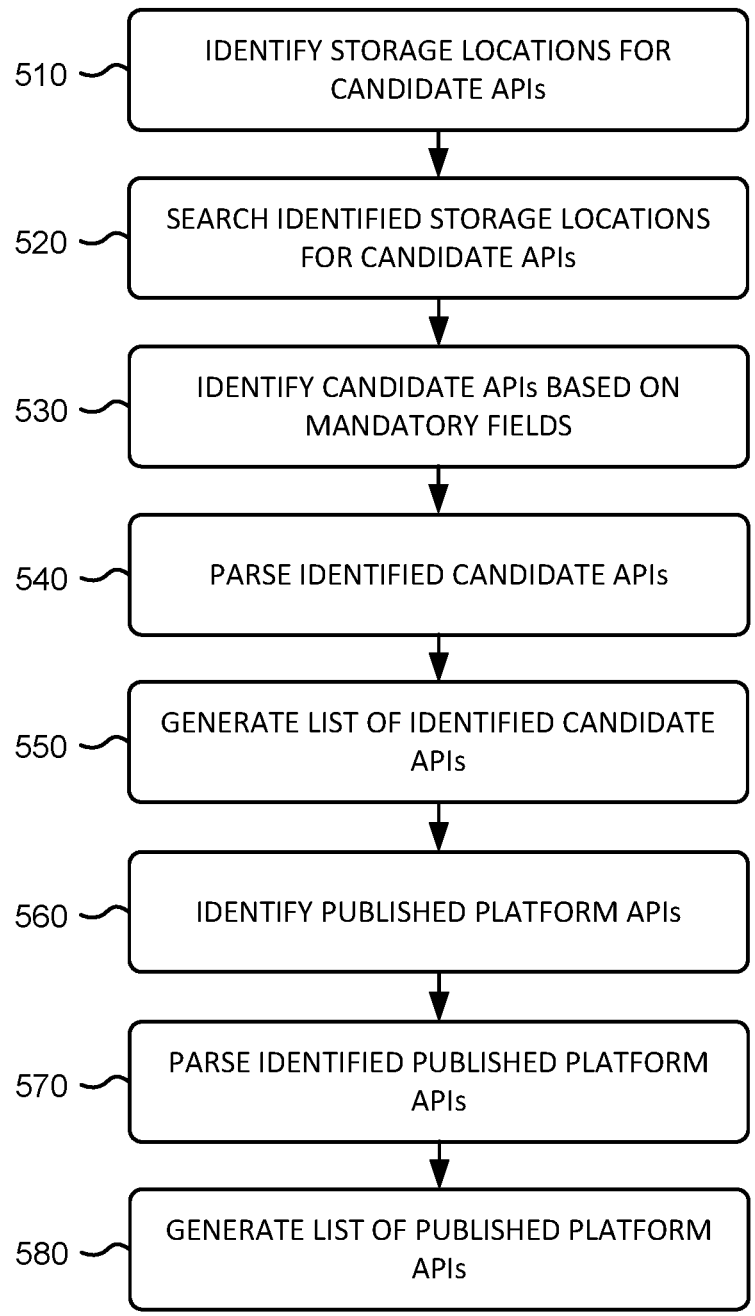
FIG. 5 is a flowchart of a process for generating a candidate API list and a published API list according to an implementation described herein.

FIG. 5 is a flowchart of a process for generating candidate API list and published API list according to an implementation described herein. In some implementations, the process of FIG. 5 may be performed by testing system 160. In other implementations, some or all of the process of FIG. 5 may be performed by another device or a group of devices separate from testing system 160.

The process of FIG. 5 may include identifying storage locations for candidate APIs (block 510), searching the identified storage locations for candidate APIs (block 520), and identifying candidate APIs based on mandatory fields (block 530). For example, API storage system interface 310 may, at particular intervals or in response to a request from API storage system 150, search multiple storage locations for candidate APIs. The multiple storage locations may include multiple API storage systems 150 identified in storage locations DB 315. API storage system interface 310 may identify candidate APIs by identifying one or more mandatory fields (e.g., name, version, and context) in a particular format. In some implementations, the particular format may include a particular file name formats and/or particular file name extensions. The identified candidate APIs may be parsed (block 540) and a list of identified candidate APIs may be generated (block 550). For example, parser 340 may parse the identified candidate APIs into a format associated with IoT platform system 170 and the parsed candidate APIs may be stored in candidate API DB 345.

Published identified platform APIs may be identified (block 560), the identified published platform APIs may be parsed (block 570), and a list of published platform APIs may be generated (block 580). For example, IoT platform interface 320 may, at particular intervals, synchronize the published APIs on IoT platform system 170 with the published APIs stored in published API DB 355 by obtaining a list of published platform APIs from IoT platform system 170. In some implementations, the published platform APIs may be parsed if the format used by virtual machine IoT platform 350 differs from the format used by IoT platform system 170. Processing may continue to FIG. 6 to compare the generated candidate API list with the generated published API list.

Figure 6:
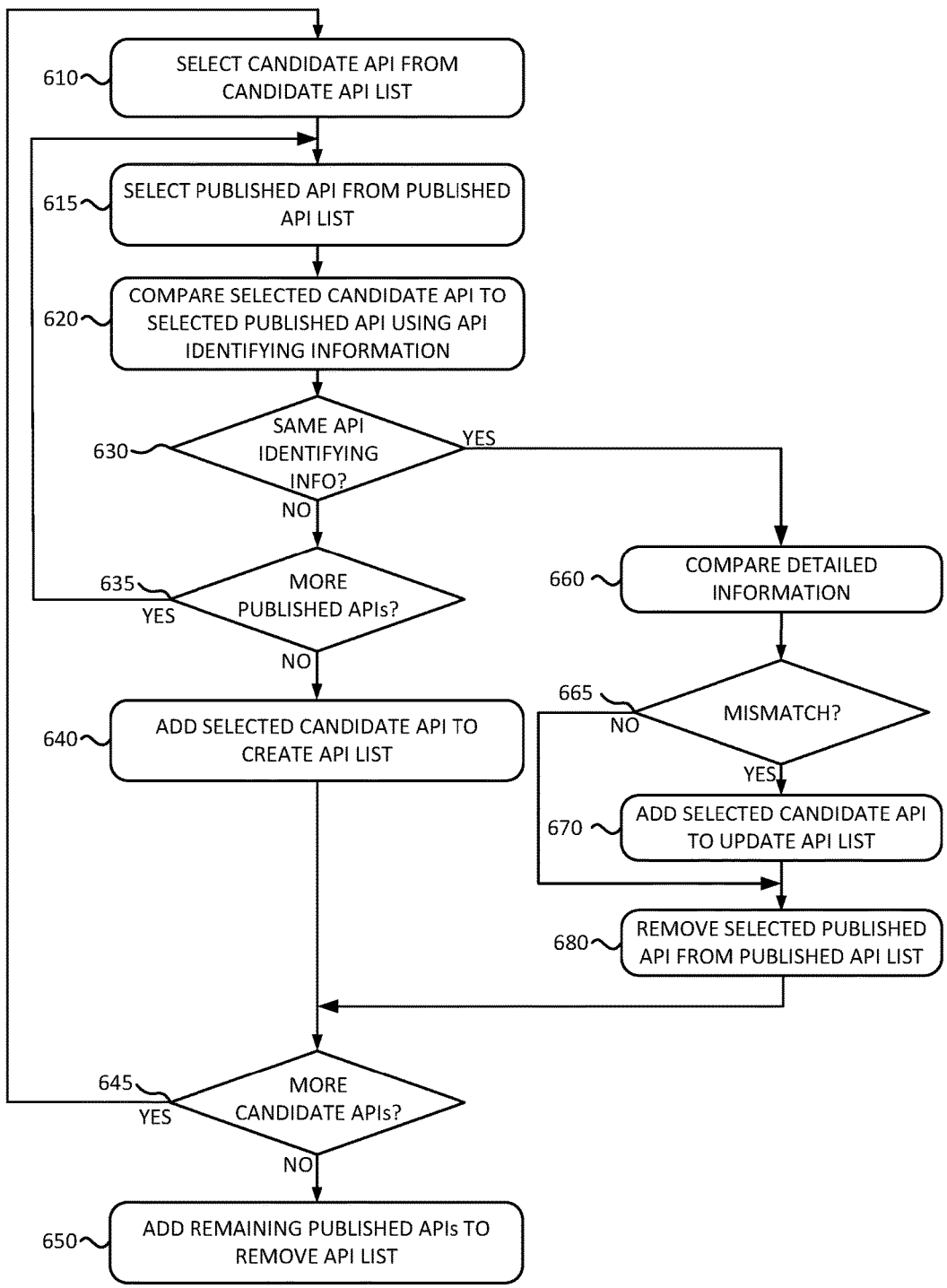
FIG. 6 is a flowchart of a process for processing a candidate API list according to an implementation described herein.

FIG. 6 is a flowchart of a process for processing a candidate API list according to an implementation described herein. In some implementations, the process of FIG. 6 may be performed by testing system 160. In other implementations, some or all of the process of FIG. 6 may be performed by another device or a group of devices separate from testing system 160.

The process of FIG. 6 may include selecting a candidate API from the candidate API list (block 610), selecting a published API from the published API list (block 620), and comparing the selected candidate API to the selected published API using API identifying information (block 620). In some implementations, the API identifying information may include the name and version of an API. For example, publishing module 330 may compare the API ID fields 410 and version fields 415 of the selected candidate API from candidate API DB 345 and the selected published API from published API DB 355. In other implementations, the API identifying information may include a different combination of mandatory and/or optional fields in addition to, or in place of, the name and version of an API. For example, any combination of fields from API records 401 of candidate API DB 345 and published API DB 355 may be used as the API identifying information.

If the API identifying information is not the same (block 630—NO), a determination may be made if there are more published APIs to compare with the selected candidate API (block 635). If there are more published APIs to compare (block 635—YES), processing may return to block 615 to select the next published API from the published API list. If there are no more published APIs to compare (block 635—NO), the selected candidate API is added to the create API list (block 640) and a determination is made so to whether there are more candidate APIs to compare (block 645). If it is determined that there are more candidate APIs (block 645—YES), processing may return to block 610 to select the next candidate API. If it is determined that there are no more candidate APIs (block 645—NO), any remaining published APIs are added to the remove API list (block 650), because the remaining published APIs are not associated with any candidate APIs and therefore do not need to be updated and tested. Thus, after all of the candidate APIs are exhausted for comparison, the remaining APIs in the list of published platform APIs are added to API remove list.

Returning to block 630, if the API identifying information is the same (block 630—YES), detailed information may be compared (block 660). For example, publishing module 330 may compare all the remaining fields of the selected candidate API from candidate API DB 345 and the selected published API from published API DB 355 to determine if any of the remaining fields differ between the selected candidate API and the selected published API. If there is a mismatch (block 665—YES), the selected candidate API is added to the update API list (block 670) and the selected published API is removed from the published API list (block 680). If there is no mismatch (block 665—NO), the selected published API is also removed from the published API list (block 680). Processing continues to block 645. After the process of FIG. 6, processing may continue to FIG. 7 to process the create API list, the update API list, and the remove API list.

Figure 7:
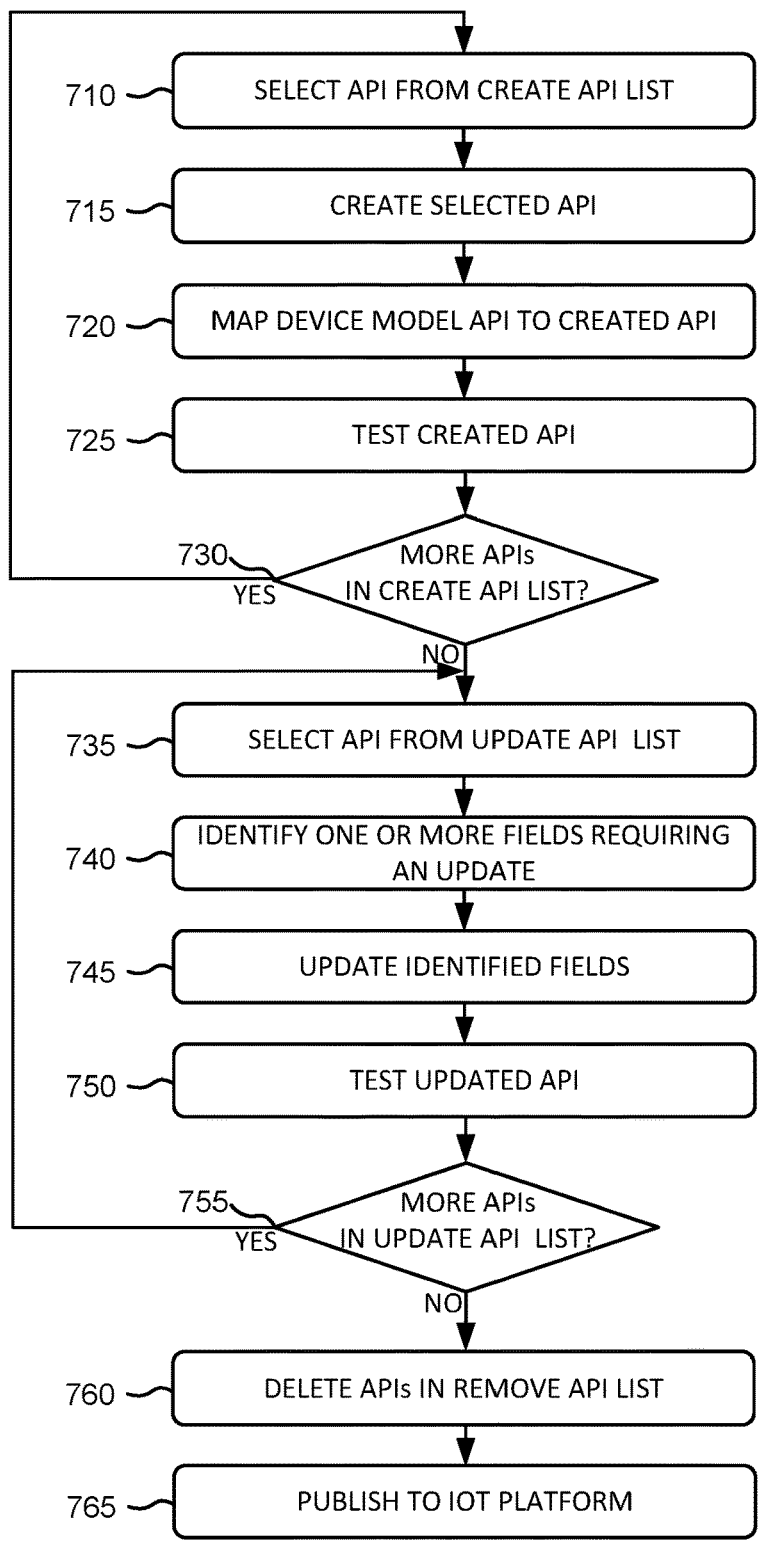
FIG. 7 is a flowchart of a process for publishing APIs according to an implementation described herein.

FIG. 7 is a flowchart of a process for publishing APIs according to an implementation described herein. In some implementations, the process of FIG. 7 may be performed by testing system 160. In other implementations, some or all of the process of FIG. 7 may be performed by another device or a group of devices separate from testing system 160.

The process of FIG. 7 may include selecting an API from the create API list (block 710) and creating the selected API (block 715). For example, API creation module 332 may generate a new API record 401 in published API DB 355 and may copy the information from the API record 401, associated with the selected API in candidate API DB 345, to the created API record 401 in published API DB 355.

A device model API may be mapped to the created API (block 720). For example, publishing module 330 may identify a device model type based on information stored in the context field 420 and/or based on information stored in tags field 430 and may select a device model type API based on the identified information. Publishing module 330 may then map the parameters identified in parameters field 422 to the parameters associated with selected device model type API. The created API may be tested (block 725). For example, testing module 460 may run one or more testing scripts to test the behavior of the created API under various situations.

A determination may be made as to whether there are more APIs in the create API list (block 730). If more APIs are in the create API list (block 730—YES), processing may return to block 710 to select the next API to be created. If there are no more APIs in the create API list (block 730—NO), processing may continue to process the update API list.

An API may be selected from the update API list (block 735) and one or more field requiring an update may be identified (block 740) and updated (block 745). For example, API update module 334 may compare each field in API record 401 in published API DB 355 with a corresponding field in the corresponding API record 401, associated with the selected API in candidate API DB 345. Each field that is identified as including differing information may be updated by copying information from the field in candidate API DB 345 to the corresponding field in in published API DB 355. The updated API may be tested (block 750). For example, testing module 460 may run one or more testing scripts to test the behavior of the updated API under various situations. The testing scripts for testing a created API may be different from the testing scripts for testing an updated API.

A determination may be made as to whether there are more APIs in the update API list (block 755). If more APIs are in the update API list (block 755—YES), processing may return to block 735 to select the next API to be updated. If there are no more APIs in the update API list (block 755—NO), processing may continue to delete APIs in the remove API list (block 760). Published APIs that do not correspond to APIs that need to be updated may be removed from published API DB 355, because there are no changes to the APIs in the API remove list that need to be updated and tested. Thus, API remove module 336 may delete the API records 401 included on the API remove list from published API DB 355. In other implementations, the API records 401 for APIs on the remove API list may not be deleted but designated as inactive in published API DB 355.

APIs that have been successfully tested may be published to the IoT platform (block 765). APIs that have not been successfully tested may be flagged and/or marked as inactive. Publishing module 330 may then instruct IoT platform interface 320 to synchronize the information in published API DB 355 with IoT platform system 170 and IoT platform interface 320 may publish the APIs in published API DB 355 to IoT platform system 170.

Figure 8:
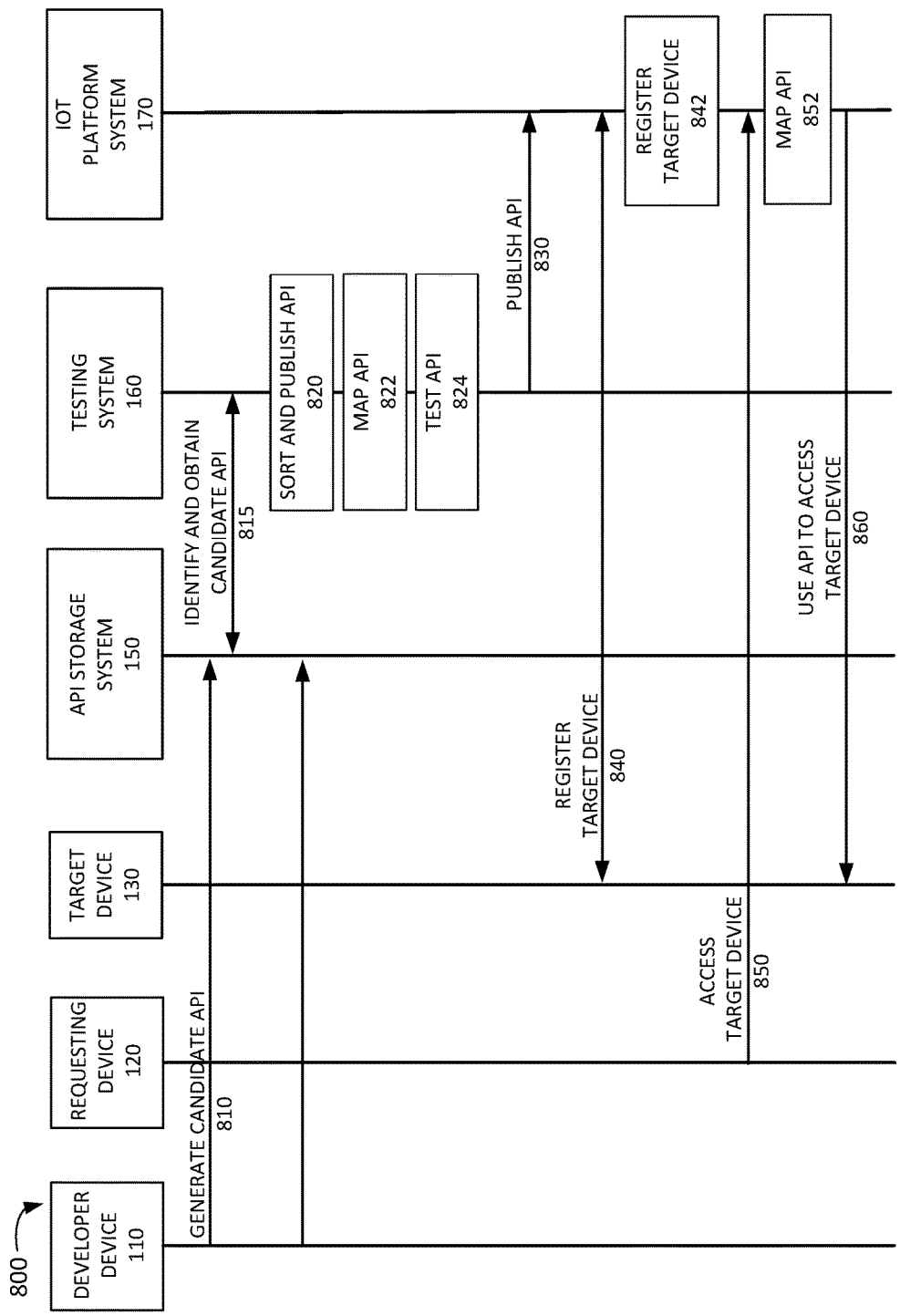
FIG. 8 is a diagram of an exemplary signal flow according to an implementation described herein.

FIG. 8 is a diagram of an exemplary signal flow scenario 800 according to an implementation described herein. As shown in FIG. 8, signal flow scenario 800 may include developer device 110 generating a candidate API for target device 130 and storing the candidate API in API storage system 150 (signal 810). For example, if target device 130 is a vending machine, the candidate API may correspond to an API to retrieve transaction data for transactions processed during a particular time period (e.g., the last 24 hours). Testing system 160 may scan API storage systems 150 at particular intervals for candidate APIs and may identify the candidate API for retrieving transaction data based on mandatory fields included in a specified format, such as a name, version, and context (signal 815). In some implementations, candidate APIs may be identified based on a filename format. For example, the transaction data API may be stored in a file named candidateAPI-transaction-data-V1.txt.

Testing system 160 may sort and publish the candidate API as a newly created API along with other identified and collected APIs in a virtual model of IoT platform system 170 on testing system 160 (block 820). Furthermore, testing system 160 may map the newly created candidate API to a device model API (block 822). For example, the transaction data API may be mapped to a manufacturer-independent vending machine device model API. The mapped candidate API may be tested with one or more automated testing scripts to determine whether the candidate API exhibits expected behavior, such as returning expected data types, returning expected errors if required parameters are omitted, etc. (block 824). If testing is successful, the candidate API may be published to IoT platform system 170 (signal 830). The published API may include a URL endpoint for calling the API, which may be used to call the API directly.

At a later time, target device 130 may register with IoT platform system 170 (signal 840). For example, a customer may set up a subscription for a set of vending machines and may register the vending machines with IoT platform system 170 so that the vending machines may exchange information with an accounting system that keeps track of products sold by the vending machines. IoT platform system 170 may generate a device record for target device 130 and may associate a particular device type with target device 130 as well as a particular manufacturer model with the target device 130 (block 842). The device type may be associated with a device model that includes one or more device model APIs and the manufacturer model may be associated with the published transaction data API. The device model may be, for example, a vending machine device model that includes a vending machine device model transaction data API. Thus, another M2M device, or an application on a user device, may use the vending machine device model transaction data API to request data from a vending machine without needing to know the model of the vending machine or the particular APIs associated with the model.

At a later time, requesting device 120 may select to obtain transaction data from the vending machines. Requesting device 120 may select to access target device 130 by sending a request to IoT platform system 170 using the vending machine device model transaction data API (signal 860). For example, requesting device 120 may call the vending machine device model transaction data API with a device ID parameter that identifies target device 130 and a parameter that specifies the time period for which transaction data is requested.

IoT platform system 170 may receive the request, may identify a device model record for target device 130 based on the device ID parameter included in the request, may identify the manufacturer model for target device 130 identified in the device model record, and may identify the published transaction data API for the identified manufacturer model. IoT platform system 170 may map the vending machine device model transaction data API request to a published transaction data API request and may send the published transaction data API to target device 130 (signal 860). Target device 130 may respond with the requested transaction data and IoT platform system 170 may provide the requested transaction data to requesting device 120 using the vending machine device model transaction data API (not shown in FIG. 8).

Figure 9:
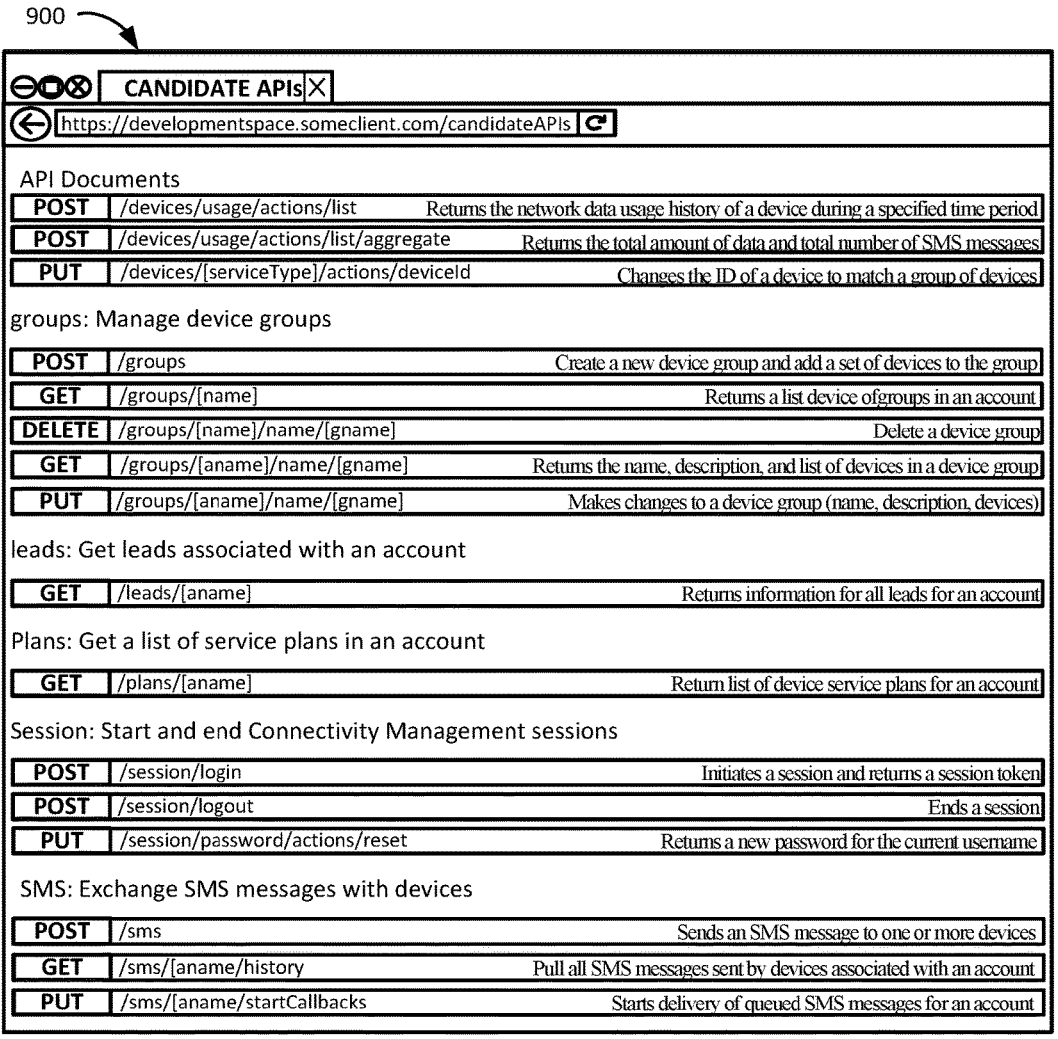
FIG. 9 is a diagram of an exemplary candidate API storage location used to generate a candidate API list according to an implementation described herein.

FIG. 9 is a diagram of an exemplary candidate API set 900 used to generate a candidate API list according to an implementation described herein. Candidate API set 900 may be organized as a web page document with a list of candidate APIs and/or links to candidate APIs stored on API storage system 150. Testing system 160 may store the URL associated with candidate API set 900 in storage locations DB 315 and may access the URL at particular intervals. After accessing the URL, testing system 160 may identify the listed candidate APIs and the associated links and may follow the links on the web page to access the individual candidate API files and obtain the candidate API files for automated publishing.

Figure 10:
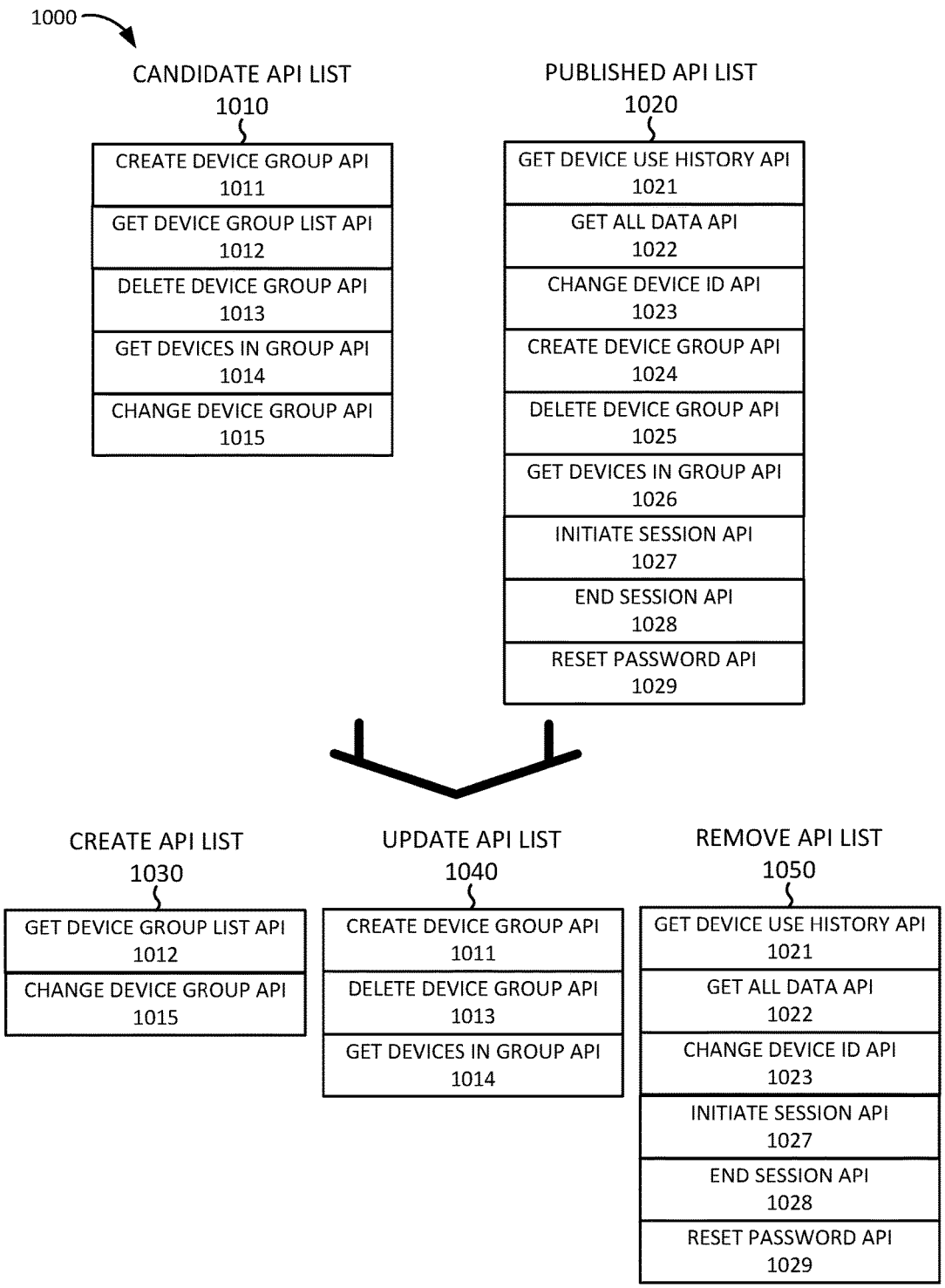
FIG. 10 is an exemplary candidate API processing scenario according to an implementation described herein.

FIG. 10 is an exemplary candidate API processing scenario 1000 according to an implementation described herein. As shown in FIG. 10, candidate API processing scenario 1000 may include a candidate API list 1010 generated by testing system 160 by searching one or more API storage systems 150. Candidate API list 1010 may include a create device group API 1011, a get device group list API 1012, a delete device group API 1013, a get devices in group API 1014, and change device group API 1015. Furthermore, candidate API processing scenario 1000 may include a published API list 1020 generated by testing system 160 by searching the published APIs on IoT platform system 170. Published API list 1020 may include get device use history API 1021, get all data API 1022, change device ID API 1023, create device group API 1024, delete device group API 1025, get devices in group API 1026, initiate session API 1027, end session API 1028, and reset password API 1029.

Testing system 160 may compare candidate API list 1010 and published API list 1020 to generate a create API list 1030, an update API list 1040, and a remove API list 1050. Create API list 1030 may include APIs that do not exist on IoT platform system 170 and need to be created. Create API list 1030 is generated to include APIs that are not identified in published API list 1020 and, in scenario 1000, include get device group list API 1012 and change device group API 1015.

Update API list 1040 may include APIs that exist on IoT platform system 170, but that need to be updated based on a new candidate API file existing. Update API list 1040 is generated to include APIs that are identified as having a matching name and version number with an API included in published API list 1020, but that are different in detailed information, such as one or more fields included in the API file and, in scenario 1000, include create device group API 1011 and get devices in group API 1014.

Remove API list 1050 may include published APIs from published API list 1020 that do not match any candidate APIs and that therefore do not need to be tested on testing system 160. APIs on the remove API list 1050 are removed from testing system 160 and, in scenario 1000, include get device use history API 1021, get all data API 1022, change device ID API 1023, initiate session API 1027, end session API 1028, and reset password API 1029.

Figure 11A:
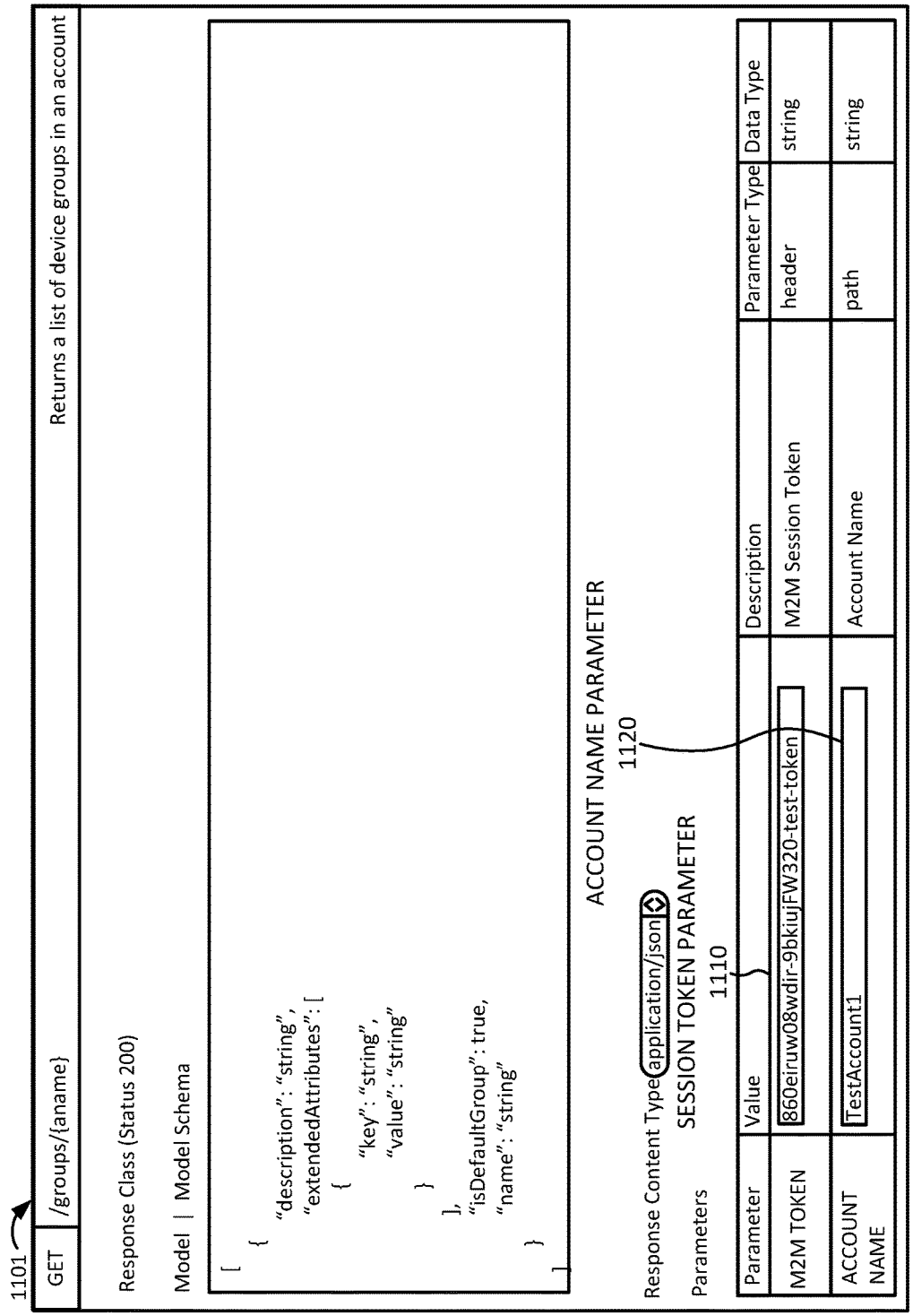
FIGS. 11A-11C are diagrams illustrating testing of an API according to an implementation described herein.
Figure 11B:
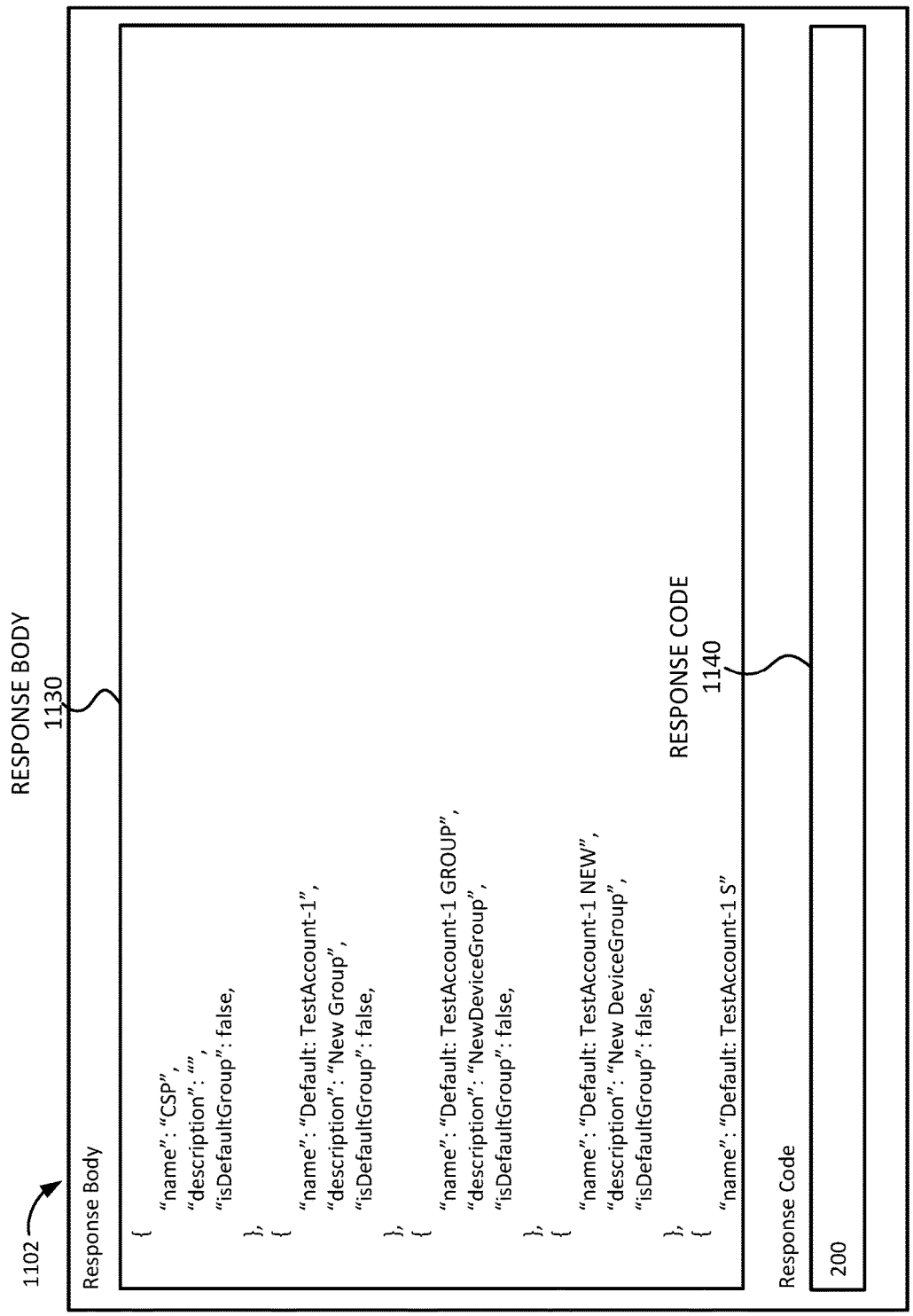
Figure 11C:
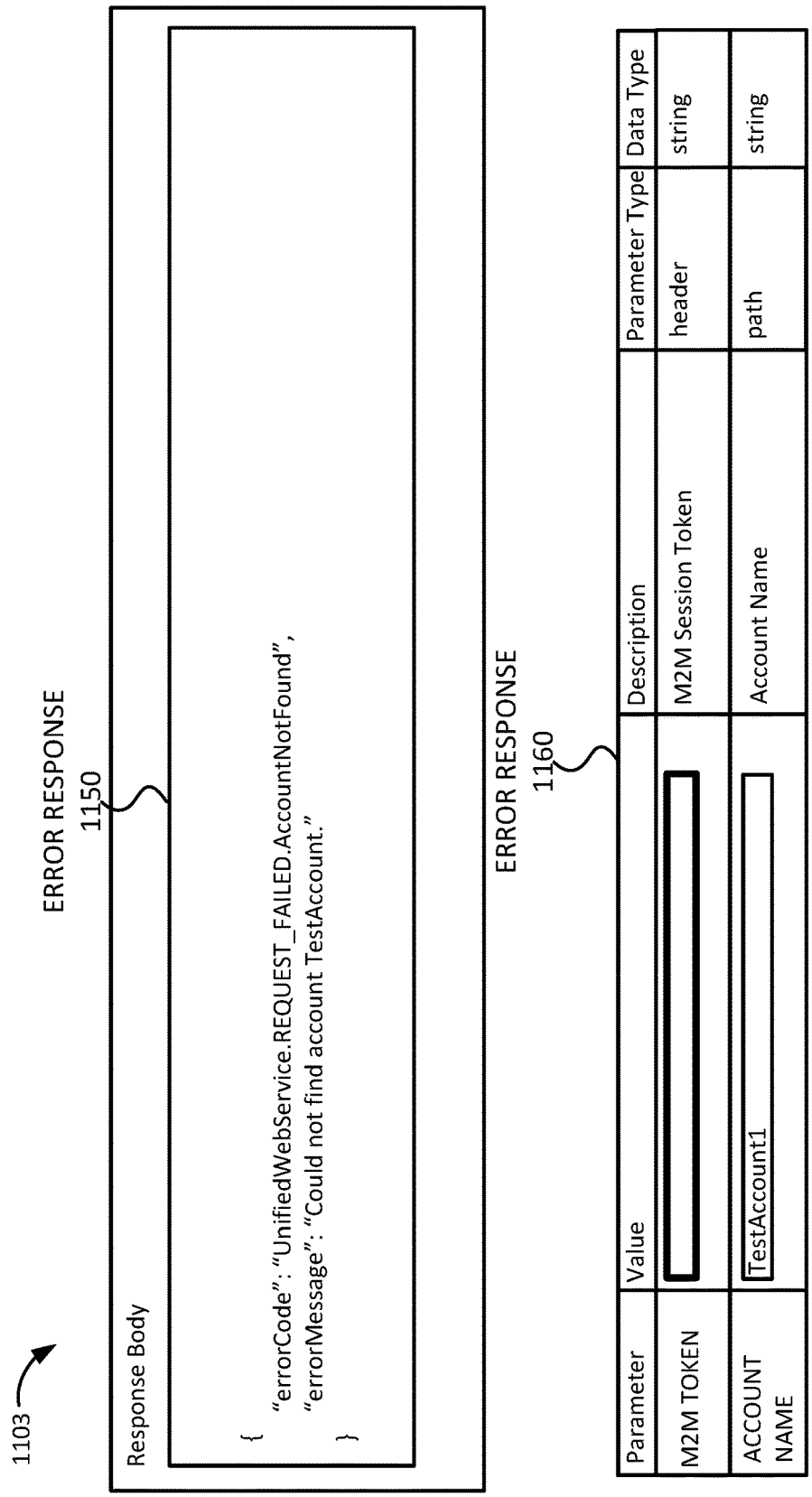

FIGS. 11A-11C are diagrams illustrating testing of an API according to an implementation described herein. FIG. 11A shows a candidate API 1101 that returns a list of device groups for a particular account. Candidate API 1101 includes two required input parameters: a M2M session token parameter 1110 and an account name parameter 1120. Candidate API 1101 may need to be tested with respect to the required input parameters.

FIG. 11B illustrates a response 1102 returned by the API if both input parameters are included. The response may include a response body 1130 that returns the list of devices and a response code 1140, which returns a response code that indicates that no error was returned. A testing script may be run by testing system 160 to obtain response 1102 and response 1102 may be analyzed for expected behavior.

FIG. 11C illustrates error responses 1103 that may be returned if the API is called with an incorrect or missing input parameter. As example, the candidate API may be tested with an automated script that provides a nonexistent account name and the candidate API may return error response 1150 that includes a message informing that the specified account name was not found. As another example, the candidate API may be tested with an automated script that omits the session token parameters and the candidate API may return error response 1160 that highlights the mandatory parameter.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5-7, and a series of signal flows has been described with respect to FIG. 8, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer system, the method comprising:

searching, by the computer system, a plurality of storage locations for candidate Application Programming Interface (API) files that are to be published on an Internet of Things (IoT) platform configured to interact with IoT devices associated with a plurality of different device manufacturers;

generating, by the computer system, a list of candidate APIs based on searching the plurality of storage locations, wherein generating the list of candidate APIs includes identifying the candidate APIs based on identifying one or more mandatory fields associated with platform APIs published on the IoT platform;

generating, by the computer system, a list of published platform APIs published on the IoT platform;

comparing, by the computer system, the generated list of candidate APIs with the generated list of published platform APIs using one or more fields designated as API identifying information fields and using one or more fields designated as detailed information fields;

generating, by the computer system, an API create list based on the comparing using the one or more fields designated as API identifying information fields, wherein the API create list includes APIs from the candidate list that are to be created, and wherein generating the API create list includes:

selecting a particular candidate API from the generated list of candidate APIs;

determining that the selected particular candidate API has no matching name and version in the list of published platform APIs based on the one or more fields designated as API identifying information; and adding the selected particular candidate API to the API create list based on determining that the selected particular candidate API has no matching name and version in the list of published platform APIs;

generating, by the computer system, an API update list based on the comparing using the one or more fields designated as detailed information fields, wherein the API update list includes APIs from the candidate list that correspond to APIs from the list of platform APIs that are to be updated, and wherein generating the API update list includes:

determining that the selected particular candidate API has a matching name and version in the list of published platform APIs with a particular platform API in the list of published platform APIs based on the one or more fields designated as API identifying information fields;

determining that the selected particular candidate API and the particular published platform API have a mismatch in the one or more fields designated as detailed information fields; and adding the selected particular candidate API to the API update list based on determining that the selected particular candidate API and the particular published platform API have a mismatch in the one or more fields designated as detailed information fields;

creating, by the computer system, one or more candidate APIs from the generated API create list on a testing system;

updating, by the computer system, one or more candidate APIs from the generated API update list on the testing system;

testing, by the computer device, an API from the generated API create list or the generated API update list using the testing system;

determining, by the computer device, that the testing of the API was successful;

publishing, by the computer device, the API to the IoT platform based on determining that the testing of the API was successful;

receiving, by the computer device and from a requesting device, a first request for a target IoT device associated with the published API; and sending, by the computer device, a second request to the target IoT device using the published API based on the received first request.

2. The method of claim 1, further comprising:
parsing the identified candidate APIs into a format that includes the one or more mandatory fields and one or more optional attribute fields.

3. The method of claim 1, wherein the one or more fields designated as detailed information fields include at least two of:
a visibility field that identifies whether an API is public or private;
a description field that includes information describing the API;
a tags field that includes one or more tags associated with the API;
a Uniform Resource Locator (URL) pattern associated with the API;
Hypertext Transfer Protocol verbs associated with the API;
a URL endpoint associated with the API;
a supported transport type associated with the API;
one or more data throttling tiers associated with the API; or
information identifying a default version of the API.

4. The method of claim 1, wherein generating the API update list based on the comparing includes:
determining that the selected particular candidate API has a matching name and version in the list of platform APIs with a particular published platform API in the list of published platform APIs based on the one or more fields designated as API identifying information fields;
determining that the selected particular candidate API and the particular published platform API do not have a mismatch in each of the one or more fields designated as detailed information fields; and
removing the particular published platform API from the list of published platform APIs, in response to determining that the selected particular candidate API and the particular published platform API do not have a mismatch in each of the one or more fields designated as detailed information fields.

5. The method of claim 4, further comprising:
generating a remove API list by adding any remaining published platform APIs to the remove API list after all candidate APIs from the generated list of candidate APIs have been compared with all published platform APIs in the generated list of published platform APIs.

6. The method of claim 1, wherein creating the one or more candidate APIs from the generated API create list on a testing system includes:
selecting a particular candidate API from the generated API create list;
publishing the selected particular candidate API to the testing system; and
mapping a first plurality of fields from the selected particular candidate API to a second plurality of fields for a device model API, wherein the device model API is independent of a manufacturer implementation of a target device associated with the device model API.

7. The method of claim 1, wherein testing the API from the generated API create list or the generated API update list using the testing system includes:
   testing the API using one or more automated testing scripts.

8. The method of claim 1, wherein updating the one or more candidate APIs from the generated API update list on the testing system includes:
   selecting a particular candidate API from the generated API update list;
   identifying one or more fields of the selected particular candidate API that differ from a published version of the selected particular candidate API; and
   updating the identified one or more fields of the selected particular candidate API in the published version of the selected particular candidate API.

9. A computer system comprising:
   a memory device storing instructions executable by one or more processors; and
   a processor configured to execute the instructions to:
   search a plurality of storage locations for candidate Application Programming Interface (API) files that are to be published on an Internet of Things (IoT) platform configured to interact with IoT devices associated with a plurality of different device manufacturers;
   generate a list of candidate APIs based on searching the plurality of storage locations, wherein when generating the list of candidate APIs, the processor is further configured to identify the candidate APIs based on identifying one or more mandatory fields associated with platform APIs published on the IoT platform;
   generate a list of published platform APIs published on the IoT platform;
   compare the generated list of candidate APIs with the generated list of published platform APIs using one or more fields designated as API identifying information fields and using one or more fields designated as detailed information fields;
   generate an API create list based on the comparing using the one or more fields designated as API identifying information fields, wherein the API create list includes APIs from the candidate list that are to be created, and wherein when generating the API create list based on the comparing, the processor is further configured to:
      select a particular candidate API from the generated list of candidate APIs;
   determine that the selected particular candidate API has no matching name and version in the list of published platform APIs based on the one or more fields designated as API identifying information fields; and
   add the selected particular candidate API to the API create list based on determining that the selected particular candidate API has no matching name and version in the list of published platform APIs;
   generate an API update list based on the comparing using the one or more fields designated as detailed information fields, wherein the API update list includes APIs from the candidate list that correspond to APIs from the list of platform APIs that are to be updated, and wherein when generating the API update list based on the comparing, the processor is further configured to:
   determine that the selected particular candidate API has a matching name and version in the list of published platform APIs with a particular platform API in the list of published platform APIs based on the one or more fields designated as API identifying information fields;
   determine that the selected particular candidate API and the particular published platform API have a mismatch in the one or more fields designated as detailed information fields; and
   add the selected particular candidate API to the API update list based on determining that the selected particular candidate API and the particular published platform API have a mismatch in the one or more fields designated as detailed information fields;
   create one or more candidate APIs from the generated API create list on a testing system;
   update one or more candidate APIs from the generated API update list on the testing system;
   test an API from the generated API create list or the generated API update list using the testing system;
      determine that the testing of the API was successful;
   publish the API to the IoT platform based on determining that the testing of the API was successful;
   receive, from a requesting device, a first request for a target IoT device associated with the published API; and
   send a second request to the target IoT device using the published API based on the received first request.

10. The computer system of claim 9, wherein when creating the one or more candidate APIs from the generated API create list on a testing system, the processor is further configured to:
   select a particular candidate API from the generated API create list;
   publish the selected particular candidate API to the testing system; and
   map a first plurality of fields from the selected particular candidate API to a second plurality of fields for a device model API, wherein the device model API is independent of a manufacturer implementation of a target device associated with the device model API.

11. The computer system of claim 10, wherein, when testing the API from the generated API create list or the generated API update list using the testing system, the processor is further configured to:
   test the API using one or more automated testing scripts.

12. The computer system of claim 9, wherein when updating the one or more candidate APIs from the generated API update list on the testing system, the processor is further configured to:
   select a particular candidate API from the generated API update list;
   identify one or more fields of the selected particular candidate API that differ from a published version of selected particular candidate API; and
   update the identified one or more fields of the selected particular candidate API in the published version of the selected particular candidate API.

13. The computer system of claim 9, wherein the processor is further configured to:
   test another API from the generated API create list or the generated API update list using the testing system;
      determine that the testing of the other API was not successful; and
      mark the other API as inactive, in response to determining that the testing of the other API was not successful.

14. The computer system of claim 9, wherein the processor is further configured to: parse the identified candidate APIs into a format that includes the one or more mandatory fields and one or more optional attribute fields.

15. The computer system of claim 9, wherein the one or more fields designated as detailed information fields include at least two of:
- a visibility field that identifies whether an API is public or private;
- a description field that includes information describing the API;
- a tags field that includes one or more tags associated with the API;
- a Uniform Resource Locator (URL) pattern associated with the API;
- Hypertext Transfer Protocol verbs associated with the API;
- a URL endpoint associated with the API;
- a supported transport type associated with the API;
- one or more data throttling tiers associated with the API; or
- information identifying a default version of the API.

16. A non-transitory memory device storing instructions executable by one or more processors, the non-transitory memory device comprising:
  one or more instructions to search a plurality of storage locations for candidate Application Programming Interface (API) files that are to be published on an Internet of Things (IoT) platform configured to interact with IoT devices associated with a plurality of different device manufacturers;
one or more instructions to generate a list of candidate APIs based on searching the plurality of storage locations, wherein the one or more instructions to generate the list of candidate APIs further include one or more instructions to identify the candidate APIs based on identifying one or more mandatory fields associated with platform APIs published on the IoT platform;
one or more instructions to generate a list of published platform APIs published on the IoT platform;
one or more instructions to compare the generated list of candidate APIs with the generated list of published platform APIs using one or more fields designated as API identifying information fields and using one or more fields designated as detailed information fields;
one or more instructions to generate an API create list based on the comparing using the one or more fields designated as API identifying information fields, wherein the API create list includes APIs from the candidate list that are to be created, and wherein the one or more instructions to generate the API create list include:
one or more instructions to select a particular candidate API from the generated list of candidate APIs;
one or more instructions to determine that the selected particular candidate API has no matching name and version in the list of published platform APIs based on the one or more fields designated as API identifying information fields; and
one or more instructions to add the selected particular candidate API to the API create list based on determining that the selected particular candidate API has no matching name and version in the list of published platform APIs;
one or more instructions to generate an API update list based on the comparing using the one or more fields designated as detailed information fields, wherein the API update list includes APIs from the candidate list that correspond to APIs from the list of platform APIs that are to be updated, and wherein the one or more instructions to generate the API update list include:
one or more instructions to determine that the selected particular candidate API has a matching name and version in the list of published platform APIs with a particular platform API in the list of published platform APIs based on the one or more fields designated as API identifying information fields;
one or more instructions to determine that the selected particular candidate API and the particular published platform API have a mismatch in the one or more fields designated as detailed information fields; and
one or more instructions to add the selected particular candidate API to the API update list based on determining that the selected particular candidate API and the particular published platform API have a mismatch in the one or more fields designated as detailed information fields;
one or more instructions to create one or more candidate APIs from the generated API create list on a testing system;
one or more instructions to update one or more candidate APIs from the generated API update list on the testing system;
one or more instructions to test an API from the generated API create list or the generated API update list using the testing system;
one or more instructions to determine that the testing of the API was successful;
one or more instructions to publish the API to the IoT platform based on determining that the testing of the API was successful;
one or more instructions to receive, from a requesting device, a first request for a target IoT device associated with the published API; and
one or more instructions to send a second request to the target IoT device using the published API based on the received first request.

17. The method of claim 1, further comprising:
  testing another API from the generated API create list or the generated API update list using the testing system;
  determining that the testing of the other API was not successful; and
  marking the other API as inactive, in response to determining that the testing of the other API was not successful.

18. The non-transitory memory device of claim 16, further comprising:
  one or more instructions to test another API from the generated API create list or the generated API update list using the testing system;
  one or more instructions to determine that the testing of the other API was not successful; and
  one or more instructions to mark the other API as inactive, in response to determining that the testing of the other API was not successful.

19. The non-transitory memory device of claim 16, wherein the one or more instructions to create the one or more candidate APIs from the generated API create list on a testing system further include:
  one or more instructions to select a particular candidate API from the generated API create list;
  one or more instructions to publish the selected particular candidate API to the testing system; and
  one or more instructions to map a first plurality of fields from the selected particular candidate API to a second plurality of fields for a device model API, wherein the device model API is independent of a manufacturer implementation of a target device associated with the device model API.

20. The non-transitory memory device of claim 16, wherein the one or more instructions to test the API from the generated API create list or the generated API update list using the testing system further include:
   one or more instructions to test the API using one or more automated testing scripts.

* * * * *